(12) United States Patent
Pulakka et al.

(10) Patent No.: US 11,277,683 B2
(45) Date of Patent: Mar. 15, 2022

(54) DETERMINATION OF SOUND SOURCE DIRECTION

(71) Applicant: Nokia Technologies Oy, Espoo (FI)

(72) Inventors: Hannu Pulakka, Pirkkala (FI); Matti Hamalainen, Lempaala (FI); Mikko-Ville Laitinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/084,759

(22) Filed: Oct. 30, 2020

(65) Prior Publication Data
US 2021/0144466 A1 May 13, 2021

(30) Foreign Application Priority Data

Nov. 8, 2019 (GB) ...................... 1916256

(51) Int. Cl.
*H04R 3/00* (2006.01)
*H04R 1/32* (2006.01)
*H04R 1/02* (2006.01)

(52) U.S. Cl.
CPC ...................... *H04R 1/32* (2013.01)

(58) Field of Classification Search
CPC .......... H04R 1/32; H04R 1/323; H04R 1/326; H04R 1/34; H04R 1/342
USPC ..................................................... 381/92, 91
See application file for complete search history.

(56) References Cited

U.S. PATENT DOCUMENTS

| | | | |
|---|---|---|---|
| 2008/0267413 A1* | 10/2008 | Faller | H04S 5/00 381/1 |
| 2014/0108020 A1* | 4/2014 | Sharma | G10L 25/87 704/500 |
| 2021/0127220 A1* | 4/2021 | Parvaix | H04R 29/00 |

FOREIGN PATENT DOCUMENTS

| | | |
|---|---|---|
| WO | WO-2018/064296 A1 | 4/2018 |
| WO | WO-2018/234628 A1 | 12/2018 |
| WO | WO-2019/193248 A1 | 10/2019 |
| WO | WO-2019/215391 A1 | 11/2019 |

OTHER PUBLICATIONS

"Parametric Spatial Sound Processing" by Kowalczyk et al., IEEE Signal Processing Magazine (Year: 2015).*
"Parametric Spatial Sound Processing" by Kowalczyk et al., IEEE Signal Processing Magazine Mar. 2015 (Year: 2015).*
Kowalczyk Konrad et al. "Parametric Spatial Sound Processing: A Flexible and Efficient Solution to Sound Scene Acquisition, Modification and Reproduction" IEEE Signal Processing Magazine, IEEE Service Center, Piscataway, NJ, USA. vol 32, No. 2, Mar. 1, 2015.

* cited by examiner

*Primary Examiner* — Ammar T Hamid
(74) *Attorney, Agent, or Firm* — Harrington & Smith

(57) ABSTRACT

An apparatus including circuitry configured to: provide a plurality of metrics associated with multiple directions, wherein the metrics are dependent, for the respective multiple directions, on an amount of direct-sound propagated; accumulate, for the respective multiple directions, values dependent upon the metrics associated with the respective multiple directions to enable determination of sound source directions.

21 Claims, 3 Drawing Sheets

Figure 3:
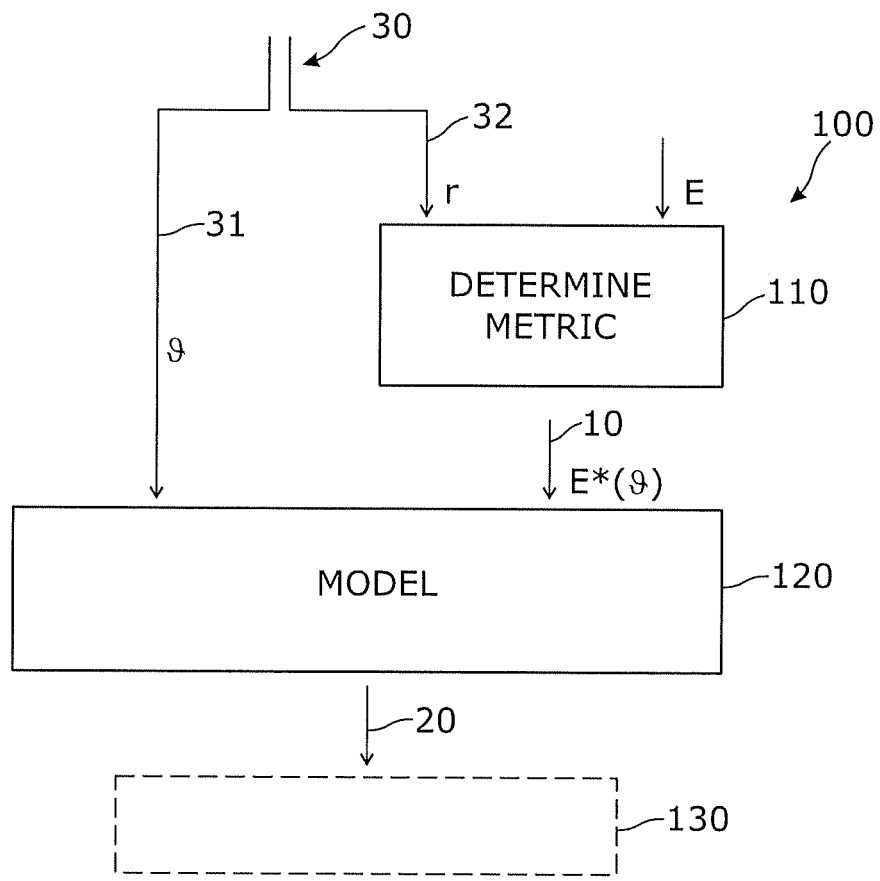

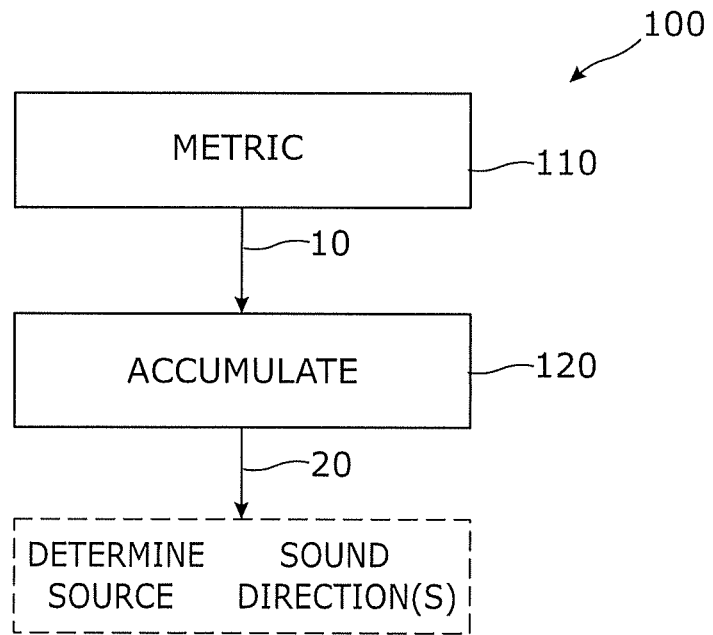
FIG. 1
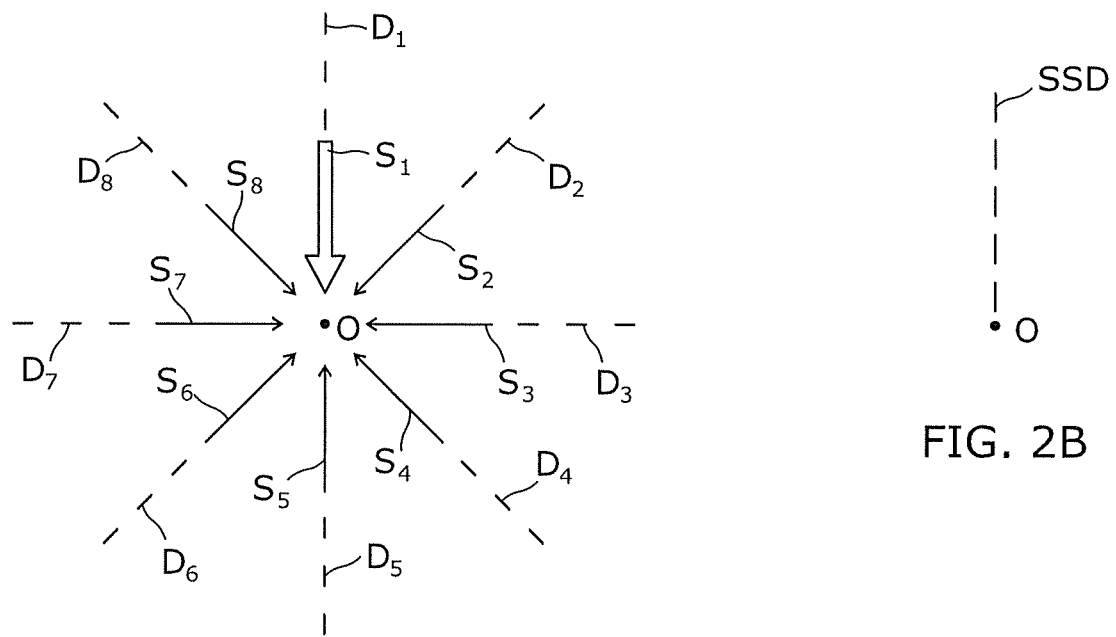
FIG. 2A
FIG. 2B

DETERMINATION OF SOUND SOURCE DIRECTION

TECHNOLOGICAL FIELD

Embodiments of the present disclosure relate to enabling determination of sound source direction.

BACKGROUND

It can be desirable to determine a direction of one or more sound sources

Current techniques can, for example, perform digital signal processing to convert delays between a correlated audio event captured at microphones of known physical offset to a position of a sound source of the audio event.

BRIEF SUMMARY

According to various, but not necessarily all, embodiments there is provided an apparatus comprising means for:
providing a plurality of metrics associated with multiple directions, wherein the metrics are dependent, for the respective multiple directions, on an amount of direct-sound propagated;
accumulating, for the respective multiple directions, values dependent upon the metrics associated with the respective multiple directions to enable determination of sound source directions.

In some but not necessarily all examples, metrics are separately determined for multiple frequencies at the same time period, wherein
accumulating, for the respective multiple directions, values dependent upon the metrics associated with the respective multiple directions to enable determination of sound source directions comprises:
accumulating, for the respective multiple directions, across multiple time periods and the multiple frequencies, values dependent upon the metrics associated with the respective multiple directions to enable determination of sound source directions.

In some but not necessarily all examples, the accumulating, for the respective multiple directions, across multiple time periods and the multiple frequencies, values dependent upon the metrics associated with the respective multiple directions uses a frequency-dependent weighting that weights values dependent upon the metrics for a first frequency more than values dependent upon the metrics for a second different frequency in the accumulation.

In some but not necessarily all examples, the apparatus comprises means for receiving metadata wherein the metadata comprises direct-sound information that provides, for the respective multiple directions, an indication of the balance between direct-sound and other sound and means for using the metadata to determine the plurality of metrics.

In some but not necessarily all examples, the metadata comprises a value dependent upon a ratio of energy of direct-sound and energy of other sound.

In some but not necessarily all examples, the apparatus comprises means for receiving metadata wherein the metadata comprises:
first metadata, used for the accumulating, and defining the respective multiple directions; and
second metadata, used for determining the metrics, and dependent, for the respective multiple directions, on an amount of direct-sound propagated relative to an amount of reverberation or ambient sound.

In some but not necessarily all examples, the metadata comprises metadata for multiple frequencies at the same time period, for multiple time periods.

In some but not necessarily all examples, accumulating, for the respective multiple directions, values dependent upon the metrics associated with the respective multiple directions to enable determination of sound source directions, uses a direct audio model defined by a kernel function that controls how the metrics are accumulated across an angular distribution.

In some but not necessarily all examples, the metrics are direct-energy metrics that indicate, for respective multiple directions, an energy of direct-sound propagated;

In some but not necessarily all examples, the direct-energy metrics are or are based on ratios of energy of direct-sound propagated to energy of total sound propagated.

In some but not necessarily all examples, the direct-energy metrics are based on energy of total sound propagated which is either determined from a received audio signal or is determined from received metadata.

In some but not necessarily all examples, the direct-energy metrics are based on mapping non-directional or total energy values to direct-energy values representative of directly-propagated sound energy.

In some but not necessarily all examples, the direct-energy metrics are determined by applying a non-linear function to non-directional or total energy values before mapping to provide the direct-energy metrics or by applying a non-linear function to direct-energy values, after mapping, to provide the direct-energy metrics.

In some but not necessarily all examples, the mapping comprises using a ratio of energy of direct-sound propagated to energy of total sound propagated to weight total energy values, or using a ratio of energy of direct-sound propagated to energy of non-direct sound propagated to weight non-direct energy values.

In some but not necessarily all examples, the mapping is frequency-dependent.

In some but not necessarily all examples, the apparatus comprises:
means for determining sound source directions based on accumulating, for the respective multiple directions, values dependent upon the metrics associated with the respective multiple directions.

In some but not necessarily all examples, the apparatus is configured to process audio signals recorded by the apparatus to provide the plurality of metrics associated with multiple directions.

In some but not necessarily all examples, the apparatus comprises means for processing one or more received audio signals to provide the plurality of metrics associated with multiple directions or comprising means for receiving the plurality of metrics associated with multiple directions.

In some but not necessarily all examples, the apparatus is configured to render audio.

In some but not necessarily all examples, the apparatus is configured to capture audio.

According to various, but not necessarily all, embodiments there is provided a method comprising:
providing a plurality of metrics associated with multiple directions, wherein the metrics are dependent, for the respective multiple directions, on an amount of direct-sound propagated;

accumulating, for the respective multiple directions, values dependent upon the metrics associated with the respective multiple directions to enable determination of sound source directions.

According to various, but not necessarily all, embodiments there is provided a computer program that, when run on a computer, performs:
providing a plurality of metrics associated with multiple directions, wherein the metrics are dependent, for the respective multiple directions, on an amount of direct-sound propagated;
accumulating, for the respective multiple directions, values dependent upon the metrics associated with the respective multiple directions to enable determination of sound source directions.

According to various, but not necessarily all, embodiments there is provided examples as claimed in the appended claims.

BRIEF DESCRIPTION

Figure 4:
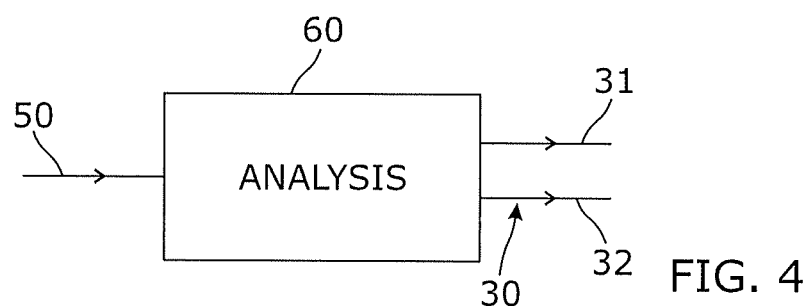
Figure 5:
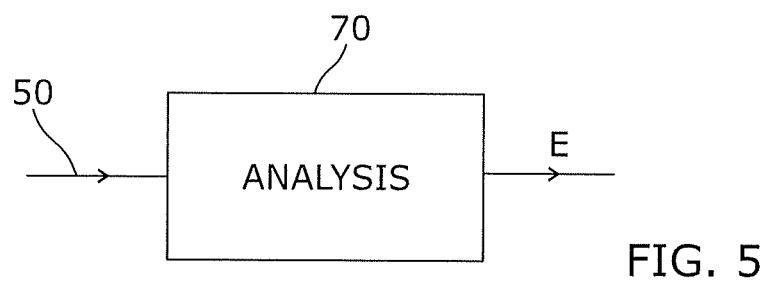
Figure 6:
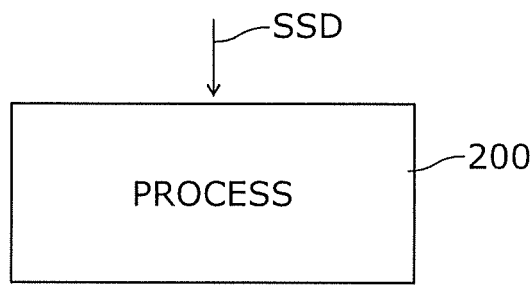
Figure 7:
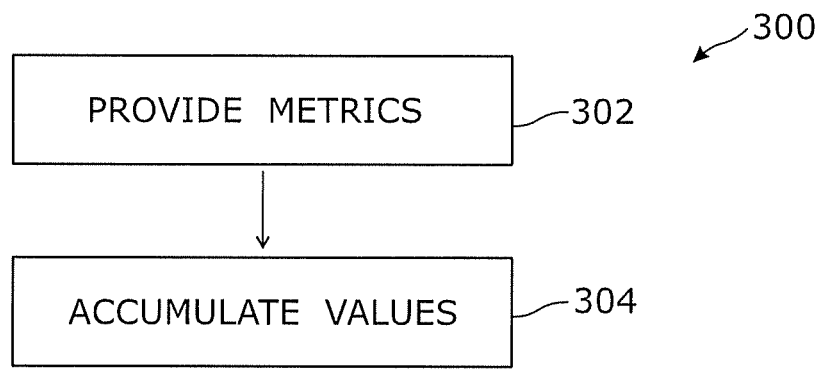
Figure 8:
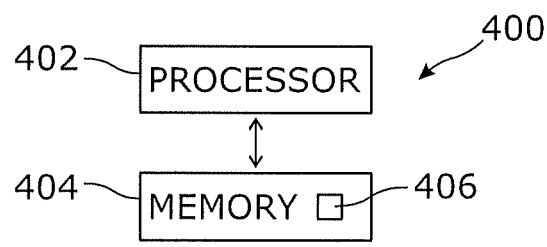
Figure 9:
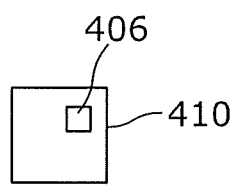

Some example embodiments will now be described with reference to the accompanying drawings in which:
FIG. 1 shows an example embodiment of the subject matter described herein;
FIG. 2A shows another example embodiment of the subject matter described herein;
FIG. 2B shows another example embodiment of the subject matter described herein;
FIG. 3 shows another example embodiment of the subject matter described herein;
FIG. 4 shows another example embodiment of the subject matter described herein;
FIG. 5 shows another example embodiment of the subject matter described herein;
FIG. 6 shows another example embodiment of the subject matter described herein;
FIG. 7 shows another example embodiment of the subject matter described herein;
FIG. 8 shows another example embodiment of the subject matter described herein; and
FIG. 9 shows another example embodiment of the subject matter described herein;

DETAILED DESCRIPTION

FIG. 1 illustrates an example of an apparatus 100 comprising:
means 110 for providing a plurality of metrics 10 and means 120 for accumulating values dependent upon the metrics 10 to enable determination of sound source directions.

FIG. 2A illustrates amounts of direct-sound $S_n$ propagated from multiple directions $D_n$. The directions $D_n$ are with respect to an origin O in this example and are illustrated using arrows. The directions $D_n$ are examples, and other directions $D_n$ can be used. The thickness of an arrow in a direction $D_n$ is indicative of an amount of direct-sound $S_n$ propagated in that direction $D_n$ towards the origin O. The directions $D_n$ may be defined using a three dimensional bearing $(\theta, \phi)$ where $\theta, \phi$ are orthogonal angles such as the elevation angle $\phi$ (which can be expressed as a polar angle $90°-\phi$) and the azimuthal angle $\theta$.

FIG. 2B illustrates a determined sound source direction SSD.

Referring back to FIG. 1, the apparatus 100 comprises:
means 110 for providing a plurality of metrics 10 associated with multiple directions $D_n$, wherein the metrics 10 are dependent, for the respective multiple directions $D_n$, on an amount of direct-sound propagated $S_n$; and
means 120 for accumulating, for the respective multiple directions $D_n$, values dependent upon the metrics 10 associated with the respective multiple directions $D_n$ to enable determination of sound source directions SSD.

Direct-sound is sound propagated directly to the origin O from a source. It is to be differentiated from indirect sound that is reflected off one or more surfaces (reverberant sound) and ambient sound that can be produced by several mutually incoherent sound sources.

The directions of one or more sound sources are derived from the accumulated values 20. The determination of sound source directions SSD can in some examples occur at the apparatus 100. However, in other examples the apparatus 100 can output the accumulated values 20 so that determination of sound source directions SSD can occur elsewhere.

Sound source directions SSD can be determined as direction to multiple sound sources at an instant of time or directions to one (or more) sound sources over instants of time.

The determination of the accumulated values 20 (and optionally the sound source directions SSD) can be performed using a low bit-rate stream, because only metrics 10 determined from audio signals are required and the original captured audio signals are not necessarily needed.

The determination of accumulated values 20 indicative of sound source directions SSD is dependent on direct-sound propagated from a direction and, in particular, is dependent upon a balance between direct-sound and other sound. The direct-sound propagated from a direction $D_1$, in FIG. 2A, has the best balance of direct sound to other sound—the amount of direct-sound is greatest in direction $D_1$.

The other sound, for direction $D_1$, is indirect sound received from direction $D_1$ (if any) and all sound received from the other directions e.g. $D_2$, $D_3$, $D_4$, $D_5$, $D_6$, $D_7$, $D_8$.

The metrics 10 can be agnostic to (independent of) an audio capture device that captures audio signals used to generate the metrics 10. Therefore, as a consequence, the accumulation value 20 and the determination of the sound source direction can be agnostic to (independent of) the audio capture device.

The metrics 10 for each direction $D_n$ can be separately determined for multiple frequencies at the same time period.

Let there be a metric $X_n$ associated with direction $D_n$, and a time-frequency tile defined by time period $\Delta t$ and frequency range $\Delta f$. There is then a value $V_n$ that depends upon $X_n$. The accumulated value 20, for a direction $D_n$, is given by $\Sigma_{\Delta t}\Sigma_{\Delta f}V_n$. The accumulated values 20, are the accumulated value for each direction $D_n$.

Consequently the means 120 for accumulating, for the respective multiple directions $D_n$, values dependent upon the metrics 10 associated with the respective multiple directions $D_n$ comprises: means 120 for accumulating for the respective multiple directions $D_n$, across multiple time periods and the multiple frequencies, values dependent upon the metrics 10 associated with the respective multiple directions $D_n$ to enable determination of sound source directions SSD.

In some but not necessarily all examples the metrics 10, which are dependent, for the respective multiple directions $D_n$, on an amount of direct-sound propagated $S_n$, are direct-sound metrics that indicate, for the respective multiple directions, an amount of direct-sound propagated.

FIG. 3 illustrates an example of the apparatus 100 as previously described. In this example the apparatus 100 comprises:

means 110 for providing a plurality of direct-sound metrics 10 associated with multiple directions, wherein the direct-sound metrics 10 indicate, for the respective multiple directions, an amount of direct-sound propagated; and means 120 for accumulating, for the respective multiple directions, values dependent upon the direct-sound metrics 10 associated with the respective multiple directions to enable determination of sound source directions.

In this example, the apparatus 100 comprises means for receiving metadata 30 and means 110 for using the metadata 30 to determine the plurality of direct-sound metrics 10.

The metadata 30 comprises direct-sound information that provides, for the respective multiple directions, an indication of an amount of direct-sound propagated. The indications of an amount of direct-sound propagated for a direction can, for example, indicate a balance between direct-sound and other sound The direct sound metrics 10 can, for example, be direct-energy metrics E* that indicate, for respective multiple directions θ, an energy of direct-sound propagated. The direct-energy metrics E* can, for example, be based on mapping non-directional or total energy values E to direct-energy values E* representative of directly-propagated sound energy. The mapping can be, at least partially, defined by metadata. For example, the metadata 30 can define a factor r that multiplies non-directional or total energy values E to provide direct-energy values E*.

The metadata 30 can therefore comprise a value r dependent upon a ratio of energy of direct-sound and energy of other sound. The other sound can, in some examples, be an amount of reverberation or ambient sound. If R1 is a ratio of energy of direct-sound to energy to other sound and R2 is a ratio of energy of direct-sound to total energy (energy of direct-sound plus energy of other sound), there is then the following mathematical relationship between R1 and R2: R2=R1/(R1+1); R1=R2/(1−R2). The value dependent upon a ratio of energy of direct-sound and energy of other sound can therefore be R1 or R2. The value can be the ratio of energy of direct-sound to energy to other sound or the ratio of energy of direct-sound to total energy (where total energy is energy of direct-sound plus energy of other sound).

The metadata 30 is dynamic and changes with time. Thus at one moment in time, the apparatus 100 is responsive to metadata 30 comprising first direct-sound information that provides, for multiple directions, an indication of a first balance between direct-sound and other sound to enable determination of a first set of sound source directions and, at a later time, the apparatus 100 is responsive to different metadata 30 comprising second different direct-sound information that provides, for multiple directions, an indication of a second balance, different to the first balance, between direct-sound and other sound to enable determination of a second set of sound source directions different to the first set of sound source directions.

The metadata 30, in some examples, is device-independent.

The metadata 30, in some examples, is comprised in a data structure with different fields for different direction indices. Each field, for a direction, indicates an amount of direct-sound propagated from that direction. In some examples, the direction indices are fixed and pre-determined. In other examples, the directions associated with the direction indices are specified in the metadata 30.

In some but not necessarily all examples, the metadata 30 comprises: first metadata 31 and second metadata 32. The first metadata 31 is used to controllably define the respective multiple directions θ. The second metadata 32 is used for determining the metrics 10. The second metadata 32 is dependent, for the respective multiple directions, on an amount of direct-sound propagated. For example, it comprises direct-sound information that provides an indication of the balance between direct-sound and other sound such as, for example, a ratio of energy of direct-sound and energy of other sound.

In some but not necessarily all examples, the metadata 31, 32 comprises metadata for multiple frequencies at the same time period, for multiple time periods. It defines an amount of direct-sound propagated for different directions in the time-frequency domain. For example it defines, in the time-frequency domain, how much of the sound energy is directional and how much of the sound energy is indirect for each direction.

Metadata 30 can be determined by analyzing audio signals 50, as illustrated in FIG. 4.

The means for performing the analysis can be at an audio capturing device at or near the microphones or at a remote downstream processing device. The analysis can, for example, be performed at the apparatus 100 or the results of the analysis can be provided to the apparatus 100.

The analysis 60 of audio signals 50, in this example, forms metadata 30 containing spatial parameters such as directions, energy ratios etc.

An example parameterization, for the first metadata 31 is one direction parameter in each frequency band θ(k, n) and, for the second metadata 32, an associated direct-to-total energy ratio in each frequency band r(k, n), where k is the frequency band index and n is the temporal frame index.

In case of a mobile phone having microphones for producing audio signals, the non-uniform shape of the audio capture device means that one of the axes (front-back) is very thin (<10 mm), which essentially means that differential information at the front-back axis between the microphone signals is only a few millimetres. In other words, that axis has a lower signal-to-noise ratio when compared to the long left-right axis for example. Therefore, a suitable choice for such a device is to only make a binary front-back choice, and to estimate a delay parameter for calculating the azimuth direction using the microphones at the longer axes. This following procedure can be used to estimate the direction parameter in a horizontal plane from a device with three microphones (a pair of left and right microphones, at front, and one microphone at rear):

Estimate a delay parameter d(k,n) in frequency bands between the left and right microphones (e.g. of the camera phone in a landscape mode).

Normalize the delay parameter d'(k, n) to be between −1 and 1, such that the maximum values are obtained when the sound arrives from the axis determine by the left-right microphone pair.

Obtain an angle parameter indicating the direction between −90 and 90 degrees by α(k, n)=arcsin (d'(k, n))

Estimate a delay parameter $d_{fb}(k,n)$ in frequency bands between front and back microphones (one of these could be the same as the left and right microphone)

Find if the front-back delay parameter $d_{fb}(k,n)$ is positive or negative. In case the delay parameter indicates the sound arriving from the rear, determine the azimuth direction by θ(k, n)=180°−α(k, n). Otherwise θ(k, n)=α(k, n).

In addition, if the device has a fourth microphone, also the elevation direction can be estimated, e.g., by:

Select another microphone pair (an up-down microphone pair) having displacement in the vertical direction and estimate another delay parameter $d_e(k,n)$ in frequency bands between them.

Normalize the delay parameter $d'_e(k,n)$ to be between −1 and 1, such that the maximum values are obtained when the sound arrives from the axis determined by the up-down microphone pair.

Obtain the elevation direction parameter (elevation angle) by $\phi(k, n)=\arcsin(d'_e(k, n))$.

If the axis determined by the up-down microphone pair has an offset from 90° to the axis determined by the left-right microphone pair, this angle can be modified to take into account the offset.

The azimuth $\theta(k, n)$ and elevation $\phi(k, n)$ directions can be combined in a vector $\theta(k, n)=(\theta(k, n), \phi(k, n))$ representing a direction $D_n$ in three-dimensional space. The directions $\theta(k, n)$ indicate the dominating direction of arrival of the propagating sound.

The second metadata 32 can comprise a direct-to-total energy ratio r.

In some but not necessarily all examples, the energy ratio parameter r can be estimated based on the normalized (between −1 and 1) cross-correlation parameter $c(k, n)$ between a microphone pair at band k.

One method to determine the energy ratio parameter r is to compare the normalized cross-correlation parameter $c(k, n)$ to a diffuse field normalized cross correlation parameter $c_D(k,n)$ and determine the ratio by $$r(k, n) = \frac{c(k, n) - c_D(k, n)}{1 - c_D(k, n)}.$$

The normalized cross-correlation is:

$$c(k, n) = \frac{\sum_{b=b_{low}(k)}^{b_{high}(k)} \text{Re}(S_2^*(b, n)S_1(b, n))}{\sum_{b=b_{low}(k)}^{b_{high}(k)} (|S_2^*(b, n)||S_1(b_2 n)|)}$$

where $S_2(b, n)$ and $S_1(b, n)$ are the microphone signals in the frequency domain, * denotes complex conjugate, Re denotes taking the real part, b is the frequency bin, $b_{low(k)}$ is the lowest bin of the frequency band k, and $b_{high(k)}$ is the highest bin of the frequency band k. One of the microphone signals may be temporally adjusted.

The diffuse field normalized cross correlation depends on the type (e.g., omni or cardioid), distance, and orientation of the microphones. As an example, for two omnidirectional microphones at the distance of d, it can be estimated as:

$$c_D(k) = \text{sinc}\left(\frac{2\pi f d}{c}\right),$$

where f is frequency, and c is the speed of sound.

The diffuse field normalized cross correlation denotes the correlation between two microphones as a function of frequency in a completely diffuse (reverberant) sound field. In the case the sound field contains only reverberation, this is the correlation (on average).

If the sound field contains only one sound source in anechoic conditions (no reverberation), the normalized cross-correlation is 1 (or close to one).

$1-c_D(k,n)$ indicates the "range", where the normalized cross-correlation is expected to be. $c(k, n)-c_D(k,n)$ denotes how much larger the normalized cross-correlation values are compared to the diffuse-field cross correlation values.

Computing the ratio of these two gives an estimate of direct sound in comparison to all sound.

This merely one example how to estimate the direct-to-total energy ratio. There are many methods to estimate it, and the optimal method can depend on the microphone array type.

The metadata 30 comprises directions $\theta(k, n)$ as first metadata 31 and energy ratios $r(k,n)$ as second metadata 32

The energy ratios $r(k, n)$ are used to determine metrics 10 at block 110 of the apparatus 100. The metrics 10 indicate the relevance of the direction of arrival estimates $\theta(k,n)$ for locating sound sources.

The metrics 10 can, for example, be direct-energy metrics that indicate, for respective multiple directions, an energy of direct-sound propagated. The direct-energy metrics can, for example, be based on mapping non-directional or total energy values E to direct-energy values E* representative of directly-propagated sound energy. The mapping can be, at least partially, defined by second metadata 32. For example, the second metadata 32 can define a factor r that multiples non-directional or total energy values E to provide direct-energy values E*.

The factor r can be a ratio of energy of direct-sound propagated to energy of total sound propagated, or a ratio of energy of direct-sound propagated to energy of non-direct sound propagated.

In some examples, the factor r can be adjusted to be frequency-dependent.

The overall time-frequency tile energy $E=e(k, n)$ can be obtained as a sum of the time-frequency tile energy values $e_j(k,n)$ of all audio channels j:

$$e(k, n) = \sum_j e_j(k, n)$$

In some examples, a weighted sum can be used if some of the audio channels are known to provide more relevant and reliable estimates. The time-frequency tile energy $e_j(k,n)$ for a more relevant channel j is multiplied by a larger weighting factor (e.g. a weighting factor greater than 1) and the time-frequency tile energy $e_j(k,n)$ for a less relevant channel j is multiplied by a lesser weighting factor (e.g. a weighting factor less than 1) before the summation. The resultant summation can be renormalized by division by the sum of the weighting factors for all channels. In some examples, a weighted sum can be used to emphasize audio channels that are known to provide more relevant and reliable estimates.

Referring to FIG. 3, for each direction estimate $\theta(k, n)$, a metric 10 is calculated at block 110 based on the energy $e(k, n)$ and the ratio $r(k,n)$.

For example, a direct-energy metric (E*) 10 can be calculated using $$E^*=w(k,n)=w_e(k,n)r(k,n)$$

Where $w_e(k, n)$, the energy value, is dependent upon the energy of the time-frequency tile $e(k,n)$.

The energy ratio $r(k, n)$, received in the second metadata 32, is used as a weighting factor to emphasize direction estimates corresponding to strongly directional sounds.

In some but not necessarily all examples, the energy value $w_e(k, n)$ is the energy of the time-frequency tile $e(k, n)$.

In other examples, the energy value $w_e(k, n)$ is based on the energy of the time-frequency tile $e(k, n)$, for example, it is functionally dependent upon the energy of the time-frequency tile $e(k, n)$.

For example, a non-linear function can be used to convert the energy of the time-frequency tile e(k,n) to an energy value $w_e$(k, n).

In some but not necessarily all examples the non-linear function is a compression function that re-scales and reduces an effect of dominant source(s) relative to weaker sources. This improves the detectability of weak secondary sources in the presence of one or more strong dominant sources.

For example, a logarithmic function can be used.

$$w_e(k,n) = 10 \log e(k,n)$$

In this example, weighting by the energy ratio r(k,n) is applied outside the non-linear function to produce w'$_e$(k, n). In other examples, the non-linear function can be applied after weighting by the energy ratio r(k, n) e.g.

$$w(k,n) = 10 \log[e(k,n)r(k,n)]$$

In some examples, the non-linear function can be arranged to truncate energy values above or below specified thresholds.

For example, a truncated non-linear function can be used.

$$w_e(k, n) = \begin{cases} 0 & \text{if } w'_e(k, n) < 0 \\ 1 & \text{if } w'_e(k, n) > 1 \\ w'_e(k, n) & \text{otherwise} \end{cases}$$

Where w'$_e$(k, n) is calculated as $$w'_e(k, n) = \frac{10 \log e(k, n) + C_e}{C_e}$$

Here, $C_e$ is a constant that specifies the range of energy levels considered for direction estimation, e.g., 60 dB.

In some but not necessarily all examples a frequency dependent weighting factor is used to emphasize direction estimates corresponding to relevant frequencies. For example, the detection of talker direction benefits from a weighting that emphasizes the speech frequency range.

The accumulating, for the respective multiple directions, across multiple time periods and the multiple frequencies, values dependent upon the metrics 10 associated with the respective multiple directions can use a frequency-dependent weighting that weights values dependent upon the metrics 10 for a first frequency more than values dependent upon the metrics 10 for a second different frequency in the accumulation.

The first frequency is within a frequency range of human speech and the second frequency is outside a frequency range of human speech.

In the example described above, the frequency dependent weighting factor $w_k$(k) can be applied before application of the non-linear function, for example:

$$w(k,n) = w_e(k,n) * r(k,n) w_k(k)$$

The apparatus 100 comprises means 120 for accumulating, for the respective multiple directions, values w(k,n) dependent upon the metrics 10 associated with the respective multiple directions $D_n$ to enable determination of sound source directions SSD. The provided metrics 10 can, for example, be: r(k,n); $w_e$(k,n) and r(k,n); $w_e$(k,n),r(k,n) and $w_k$(k); or w(k,n).

The plurality of metrics 10 are associated with multiple directions and are dependent, for the respective multiple directions on an amount of direct-sound propagated $S_n$.

As previously described, the energy E of audio signals can be determined in the time-frequency domain, and combined with the received direct-to-total energy ratios r in order to produce the metrics. For example, energy ratio r(k,n) is used as a weighting factor to emphasize direction estimates corresponding to strongly directional sounds.

In some examples, the time-frequency domain energy values e(k,n) or $e_j$(k,n) are comprised as third metadata within the metadata 30.

In other examples, the time-frequency domain energy values e.g. E or e(k,n) or $e_j$(k,n) are not comprised in the metadata 30 and they are estimated by processing means 70 processing received audio signals 50, as illustrated in FIG. 5.

The audio signals 50 can be processed by processing means 70 to calculate a (time-frequency) energy distribution (such as spectrogram).

The energy e(k, n) of a time-frequency tile is calculated from the audio signals $s_j$(t) 50. The audio signals 50 can, for example, represent one or more audio channels j over time.

The time domain signals $s_j$(t) are transformed to time-frequency domain signals $S_j$(b,n), where b is a frequency band index. The transformation can be performed using any suitable transform, such as short-time Fourier transform (STFT) or complex-modulated quadrature mirror filter bank (QMF).

The energy e(k,n) is computed in frequency bands for each channel:

$$e_j(k, n) = \sum_{b=B_{low}(k)}^{B_{high}(k)} |S_j(b, n)|^2$$

where $B_{low}$(k) is the lowest frequency band k, and $B_{high}$(k) is the highest frequency band k.

Referring back to FIG. 3, the audio signal 50 can be provided with its associated metadata to the apparatus 100. The at least one audio signal 50 and the associated metadata 32 is used by the apparatus to determine the plurality of metrics 10 associated with the respective plurality of directions. The at least one audio signal 50 can be used to determine, using processing means 70, an energy value E from the audio signals 50 and the metadata 32 can be used to convert the energy value E to a direct energy value E*. For example, a time-frequency energy distribution (spectrogram) of the audio signal and an energy value (and direct energy value) can be determined for each frequency band.

The audio signals 50 can be microphone signals, for example, captured signals from one or more microphones and/or from a microphone array or transport audio signals.

For example, a sound scene can be captured using a high-quality microphone (or microphones) that captures audio signals with high quality and microphone array microphones can be used for direction (and other spatial metadata) analysis.

In some but not necessarily all examples, the metadata 30 and the audio signal 50 is provided to the apparatus 10 as metadata assisted spatial audio (MASA). Metadata assisted spatial audio reduces a multi-channel audio signal to a smaller number of transport audio channels in combination with metadata. During rendering, the smaller number of transport audio channels in combination with metadata can be used to re-create a perceptual effect of the original multi-channel audio signal.

The MASA signal can be created from microphone-array signals (e.g., from a mobile device), and the transport audio signals and the metadata can be used to re-create a perceptual effect of the original captured sound scene.

The MASA signal can be created from multichannel loudspeaker signals, e.g., 5.1

In some but not necessarily all examples, the audio signals 50 separately represent left and right audio channels, that is there is an audio signal for the left audio channel and an audio signal for the right audio signal.

Referring to FIG. 3, the apparatus 100 comprises means 120 for accumulating, for multiple directions $D_n$, values dependent upon the metrics 10 associated with the multiple directions $D_n$ to enable determination of sound source directions SSD.

The apparatus 100 comprises means 120 to map direction information (e.g. first metadata 31) to corresponding metrics 10 representative of directly-received energy.

A model of a direction-of-arrival distribution in time is accumulated using the metrics 10 and their associated directions, for example, provided by the first metadata 31. A statistical model of direction estimates may be implemented as a histogram of direction estimates for a given time interval weighted by the corresponding metrics 10.

The direction histogram indicates a most probable direction(s) for sound sources in that time interval. The sound source direction can, for example, be estimated based on the largest value of the histogram, or by fitting a certain function to the histogram data.

The histogram can comprise an angular distribution of bins. Accumulation occurs across the angular distribution of bins based on the associated directions by binning the values dependent on the metrics 10 (in turn dependent upon second metadata 22) according to first metadata 21.

For example, 'direct' energy E* is binned by direction of arrival. The accumulation integrates the direct energy E* into direction bins over time and frequency In one example, the histogram M(n) contains a set of bins $m_l(n)$, each corresponding to a specific direction. Each metric 10 is allocated to an associated bin. The cumulative value of each bin represents an approximation of the probability that sound is received from that direction.

The histogram bins can be evenly or unevenly distributed. A higher density of histogram bins can be used in directions that are more important than others or in areas where the angular resolution of direction estimates is higher.

The histogram may be based on a rectangular projection of the azimuth and elevation to a plane so that histogram bins are distributed uniformly on the azimuth and elevation (or polar) axes. Alternatively, histogram bins can be distributed evenly on the surface of a sphere. For example, a regular polyhedron such as an octahedron or a dodecahedron can be used as a basis of the geometry. Each face of the polyhedron is then iteratively subdivided into smaller triangles with vertices on the surface of the sphere until sufficient resolution is reached. The resulting vertices are used as the directions of the histogram bins. Other geometries can be used.

In some examples accumulating, for the respective multiple directions, values w(k, n') dependent upon the metrics 10 associated with the respective multiple directions to enable determination of sound source directions, uses a direct audio model defined by a kernel function K that controls how the values w(k, n') dependent upon the metrics 10 are accumulated across an angular distribution.

For example, direction estimates θ(k,n) increase the values in histogram bins $m_l(n)$ of the histogram M(n) corresponding to time instant n:

$$m_l(n) = \sum_{n'=n-N+1}^{n} \sum_{k} K(l, \theta(k, n'))w(k, n'),$$

where
K(l,θ(k,n')) is a kernel function that specifies how the effect of direction estimate θ(k,n') is geometrically distributed over histogram bins l for directions $D_l$. The values w(k, n') dependent upon the metrics 10 are accumulated over all of the frequency bands k and N successive time frames.

The kernel function K(l,θ(k,n)) can be implemented in different ways.

In one implementation, the index l of the histogram bin nearest to the estimated direction θ(k, n) is located and the weight w(k,n) is added to the corresponding histogram bin:

$$K(l, \theta(k, n)) = \begin{cases} 1 & \text{for the bin } l \text{ with smallest angular distance to } \theta(k, n) \\ 0 & \text{otherwise} \end{cases}$$

In a different implementation, multiple histogram bins in the neighborhood of the estimated direction θ(k,n') are updated using a kernel function that typically has a peak at the estimated direction and decreases with increasing angle difference. The kernel spreads the metrics. The kernel may be, e.g., Gaussian or based on the Hann window. In one implementation, the histogram bin closest to the direction estimate is found and precalculated weights are used for nearest-neighboring bins. In a different implementation, weights can be calculated for each nearby bin from the angular difference between the direction estimate and the direction corresponding to the bin.

The time interval N of accumulating direction estimates may be one time frame. A longer time interval can be used to reduce random variation in histogram data. However, increasing the time window length also reduces the accuracy of direction estimates of moving sources.

For continuous estimation of changing directions, histograms can be generated for successive time instants. Histogram data from preceding time instants are useful in reducing random variation, but old measurements need to be eventually discarded to track moving sound sources. A simple way to implement this is to apply a forgetting factor to the previous histogram. The histogram M(n) used for detecting source directions is obtained as follows: M(n)=αM'(n)+(1−α)M(n−1) where α determines how quickly preceding information is forgotten by the system and M'(n) is the histogram accumulated for one time instant n.

In FIG. 3, the sound source direction(s) are determined by means 130 for determining sound source directions SSD based on the accumulated values.

For example, an estimation of sound source directions $θ_{ss}(i, n)$ is based on the histogram, where i is the index of the detected sound source. The means 130 for estimation of the sound source direction(s) can be at the apparatus 100 or elsewhere.

The means 130 for estimation of the sound source direction(s) may be able to estimate the direction for variable number of sound sources, and in some cases, may not be able to estimate the direction for any sound source (e.g., if all sound sources are silent). However, typically means 130 for estimation of the sound source direction(s) is able to estimate the direction for one or a few sound sources.

The direction corresponding to a global maximum of the histogram can be used as an indication of the direction of the dominant sound source $\theta_{ss}(n)$.

Multiple sound sources can be located by detecting several local maxima in the histogram.

Local maxima located close to each other can originate from a single sound source and can, in some examples, be considered a single sound source.

The following iterative algorithm can be used to detect the directions of multiple sound sources:
(i) Set M(1, n)=M(n) to initialize the histogram for detecting the direction of the first source.
(ii) Find the index l of the maximum value in the current histogram M(i,n). The estimate of sound source direction $\theta_{ss}(i, n)$ is obtained as the direction corresponding to the maximum.
(iii) Stop iteration if the desired number of source directions is found. Otherwise continue.
(iv) Remove the effect of source i from the histogram to get a new histogram M(i+1, n). This can be done by subtracting a kernel from the histogram. The kernel is centered at bin index l, its value at that bin is $m_l$, and the kernel values decrease with increasing angular distance from that bin. In other words, the bin at the found maximum i has zero value and its immediate neighborhood is smoothly attenuated in the resulting histogram M(i+1, n). The width and shape of the kernel can correspond to a typical sound source peak in the histogram.
(v) Go to step (ii) to find the next sound source i+1.

A spatial smoothing filter can also be applied to the histogram before detecting source directions.

The accuracy of the estimated sound source directions can be improved by interpolation. For example, interpolation of the peak direction can be based on a small number of histogram bins geometrically close to the bin with the maximum value. For example, a weighted sum of the directions of the neighbor bins of the bin with the maximum value can be calculated:

$$D = \sum_{p \in N(l)} D_p m_p$$

Here, N(I) is the set of indices of the bins that are geometrically close to the maximum bin I (including bin I itself). For example, N(I) can be a set of immediate geometric neighbors of bin I and I itself. $D_p$ represents the direction of bin p. In practice, the directions can be represented by points on the unit sphere in 3-dimensional Cartesian coordinates, and the azimuth and elevation of the interpolated direction are calculated from the weighted sum of the point coordinates.

Kernel functions K can be adjusted according to characteristics of the acoustic environment such as reverberation or background noise distribution to increase the accuracy in situations where the reliability of the sound source detection needs to be improved with either more or less aggressive spatial filtering to average out noise in an estimated signal. It is also possible that different applications may require more or less sensitive direction estimates e.g. to react to changes more rapidly or to apply long time averaging to identify salient low-level sound sources.

As illustrated in FIG. 6 the sound source direction SSD e.g. $\theta_{ss}(n)$ can be further processed at block 200. The block 200 can be part of the apparatus 100 or not.

In one example, the direction of the sound source $\theta_{ss}(n)$, the spatial metadata (directions $\theta(k, n)$ and energy ratios r(k, n)), and the microphone array signals $s_j(t)$ are forwarded to block 200 for audio rendering.

The audio rendering block 200 synthesizes spatial audio as signals with an audio focus pointing to the estimated direction of the sound source $\theta_{ss}(n)$. As a result, the audio focus is automatically following the detected sound source (such as a talker).

An audio focus can, for example, be achieved by temporally adjusting the microphone signals based on the microphone arrangement and the desired focus direction and summing the temporally adjusted microphone signals. More generally, the microphone signals can be processed with complex gains in the time-frequency domain and combined to obtain a focused audio signal.

The audio focus direction can be controlled to point towards potentially interesting sound sources. This is useful, e.g., when the user of a mobile device shoots a video in a noisy environment and wants to capture the sound of a talker. The method can be used to automatically detect and follow the direction of the talker to steer the audio focus direction. Audio focus can amplify the sound of the interesting source, and attenuate noises. As a result, speech intelligibility can be increased, making audio for videos shot in a noisy environment better.

A user can decide after audio capture whether to focus to a certain source or not.

The user can manually select the focus direction or the focus direction can automatically follow a sound source.

In some examples, the direction of the sound source $\theta_{ss}(n)$ can be used as inputs to further source tracking algorithms at block 200. Such algorithms can be used to:
Tag each source with a unique identifier (labeling);
Track one or more moving sources;
Smooth the movement of estimated source directions;
Lock on one or more detected sources even if they are not the strongest peaks in the histogram;
Ignore one or more sources based on some specific conditions.

In some examples, block 200 enables voice-controlled user interfaces and automatic speech recognition. The block 200 automatically detects the direction of a talker.

In some examples, the audio focus can be adjusted towards the talker to reduce distracting sounds from other sound sources in the captured audio signal and improve speech recognition performance. In some examples, the direction of the talker can be a parameter used to determine an input voice command.

In some examples, block 200 is used to detect the directions of active talkers in a meeting recording for visualization of the meeting and/or selective playback of the meeting based on speaker.

It will be appreciated from the foregoing that the apparatus 100 can receive the metrics 10 or produce the metrics 10. In some examples, the apparatus 100 comprises means for processing one or more received audio signals 50 to provide the plurality of metrics 10 associated with multiple directions. In some examples, the apparatus 100 comprises means for processing received metadata (r, E) to provide the plurality of metrics 10 associated with multiple directions.

In other examples, the apparatus 100 comprises means for receiving the plurality of metrics 10 associated with multiple directions.

It will be appreciated from the foregoing description that there can be a pipeline comprising: (i) capturing audio, (ii) producing metadata, (iii) processing metrics based at least on the metadata 30 to produce accumulated values for estimating direction(s) of one or more audio sources, (iv) determining the direction of one or more audio sources, (v) rendering audio (and/or other processing).

The apparatus 100 comprises means for performing (iii).

In some examples, the apparatus 100 comprises means for performing (ii) and (iii).

In some examples, the apparatus 100 comprises means for performing (ii), (iii) and (iv). In some examples, apparatus 100 comprises means for performing (ii), (iii), (iv) and (v). In some examples, apparatus 100 comprises means for performing (i), (ii) and (iii). In some examples, apparatus 100 comprises means for performing (i), (ii), (iii) and (iv). In some examples, apparatus 100 comprises means for performing (i), (ii), (iii), (iv) and (v). In some examples, apparatus 100 comprises means for performing (iii) and (iv). In some examples, apparatus 100 comprises means for performing (iii), (iv) and (v).

The audio can be rendered using headphones or multi-channel loudspeaker setups.

If the metadata stream 30 contains audio energy information E (in time-frequency domain), audio signals 50 are not needed as input to the apparatus 10. Instead, the time-frequency energy distribution is retrieved from the metadata 30.

In a light-weight implementation, the accumulated values based on the metrics can be determined without using time-frequency energy information. Only the time-frequency direction information 31 and corresponding time-frequency information 32 about the relative amount of directional and ambient sound energy is used. This corresponds to setting $e_j(k,n)$ to be a constant i.e. $w_e(k,n)=1$ for all k and n. Thus $w(k,n)=r(k,n)w_k(k)$ or $w(k,n)=r(k,n)$.

In these examples, the metrics 10 are direct-energy metrics that are or are based on ratios of energy of direct-sound propagated to energy of total sound propagated.

The ratio is provided in metadata 30.

In some but not all of these examples, the direct-energy metrics are based on energy of total sound propagated which is either determined from a received audio signal 50 or is determined from received metadata 30.

In the preceding examples, the metadata 30 can be metadata for perceptually accurate spatial sound reproduction.

The metadata 30 can, for example, be produced by analysing perceptually relevant parameters of the sound field in frequency bands and in short temporal intervals, e.g., the direction-of-arrival of the propagating sound at the recording position.

Spatial sound in a perceptual sense can be reproduced by rendering using the metadata creating a spatial perception similar to that which would occur if the listener was listening to the original sound field. As a result, the listener can perceive a multitude of sources, their directions and distances, as well as properties of the surrounding physical space, among the other spatial sound features, as if the listener was in the position of the capture device.

Using parametric spatial audio methods, the captured spatial audio can also be efficiently stored and/or transmitted. A small number of audio channels (e.g. one or two) may be stored alongside a parametric metadata representation of the spatial properties of the audio, instead of all the captured microphone signals.

This approach reduces the amount of data to be stored or transmitted for spatial audio reproduction. It also makes the storage, transmission, and rendering independent of the capturing device.

An example of such a parametric format is the recently proposed metadata-assisted spatial audio (MASA) format for the immersive voice and audio services (IVAS) codec.

FIG. 7 illustrates an example of a method 300 comprising:
at block 302, providing a plurality of metrics associated with multiple directions, wherein the metrics are dependent, for the respective multiple directions, on an amount of direct-sound propagated; and
at block 304, accumulating, for the respective multiple directions, values dependent upon the metrics associated with the respective multiple directions to enable determination of sound source directions.

The method 300 can be adapted as described in the preceding paragraphs describing the apparatus 100.

FIG. 8 illustrates an example of a controller 400 that can be used by the apparatus 100 or to perform other functions described. Implementation of a controller 400 may be as controller circuitry. The controller 400 may be implemented in hardware alone, have certain aspects in software including firmware alone or can be a combination of hardware and software (including firmware).

As illustrated in FIG. 8 the controller 400 may be implemented using instructions that enable hardware functionality, for example, by using executable instructions of a computer program 406 in a general-purpose or special-purpose processor 402 that may be stored on a computer readable storage medium (disk, memory etc) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus 100 when loaded into the processor 402. The computer program instructions, of the computer program 406, provide the logic and routines that enables the apparatus to perform the methods illustrated in FIGS. 1 to 7. The processor 402 by reading the memory 404 is able to load and execute the computer program 406.

The apparatus 100 can therefore comprise:
at least one processor 402; and
at least one memory 404 including computer program code
the at least one memory 404 and the computer program code configured to, with the at least one processor 402, cause the apparatus 100 at least to perform:
providing a plurality of metrics associated with multiple directions, wherein the metrics are dependent, for the respective multiple directions, on an amount of direct-sound propagated;
accumulating, for the respective multiple directions, values dependent upon the metrics associated with the respective multiple directions to enable determination of sound source directions.

As illustrated in FIG. 9, the computer program 406 may arrive at the apparatus 100 via any suitable delivery mechanism 410. The delivery mechanism 410 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 406. The delivery mechanism may be a signal configured to reliably transfer the computer program 406. The apparatus 100 may propagate or transmit the computer program 406 as a computer data signal.

Computer program instructions for causing an apparatus to perform at least the following or for performing at least the following:
providing a plurality of metrics associated with multiple directions, wherein the metrics are dependent, for the respective multiple directions, on an amount of direct-sound propagated;
accumulating, for the respective multiple directions, values dependent upon the metrics associated with the respective multiple directions to enable determination of sound source directions.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 1 to 7 may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above described examples find application as enabling components of:
automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising
at least one processor and
at least one non-transitory memory including computer program code,
the at least one memory and the computer program code configured to, with the at least one processor, cause the apparatus at least to:
receive metadata, wherein the metadata comprises direct sound information that provides an indication of a balance between direct sound and other sound;
determine a plurality of metrics associated with respective ones of multiple directions, based on the received metadata, wherein the plurality of metrics are dependent on an amount of the direct sound; and
accumulate, for the respective ones of the multiple directions, respective values dependent upon the plurality of metrics to enable determination of one or more sound source directions.

2. An apparatus as claimed in claim 1, wherein the plurality of metrics are separately determined for multiple frequencies at a same time period, wherein the apparatus is caused to accumulate, across multiple time periods and the multiple frequencies, the respective values dependent upon the plurality of metrics associated with the respective ones of the multiple directions to enable the determination of the one or more sound source directions.

3. An apparatus as claimed in claim 2, wherein the apparatus is caused to accumulate the respective values with a frequency-dependent weighting that weights values dependent upon the plurality of metrics for a first frequency more than values dependent upon the plurality of metrics for a second different frequency in the accumulation.

4. An apparatus as claimed in claim 1, wherein the metadata comprises a value dependent upon a ratio of energy of the direct sound and energy of the other sound.

5. An apparatus as claimed in claim 1, wherein the metadata comprises:
first metadata, when the apparatus is caused to accumulate, to define the respective ones of the multiple directions; and
second metadata, when the apparatus is caused to determine the plurality of metrics, dependent on the amount of direct sound relative to an amount of reverberation or ambient sound.

6. An apparatus as claimed in claim 1, wherein the metadata comprises, at least, metadata for multiple time periods, wherein metadata for a respective time period of the multiple time periods comprises metadata for multiple frequencies during the respective time period.

7. An apparatus as claimed in claim 1 wherein the apparatus is caused to accumulate with a direct audio model defined with a kernel function that controls how the the plurality of metrics are accumulated across an angular distribution.

8. An apparatus as claimed in claim 1, wherein the plurality of metrics are direct energy metrics that indicate, for the respective ones of the multiple directions, an energy of the direct sound.

9. An apparatus as claimed in claim 8, wherein the direct energy metrics are based on ratios of the energy of the direct sound to energy of total sound.

10. An apparatus as claimed in claim 9, wherein the direct energy metrics are based on the energy of the total sound which is determined from at least one of: a received audio signal; or the received metadata.

11. An apparatus as claimed in claim 9, wherein the direct energy metrics are based on mapping non-directional or total energy values to direct energy values representative of the energy of the direct sound.

12. An apparatus as claimed in claim 9, wherein the direct energy metrics are determined with applying a non-linear function to non-directional or total energy values before mapping to provide the direct energy metrics or with applying a non-linear function to direct energy values, after mapping, to provide the direct energy metrics.

13. An apparatus as claimed in claim 11, wherein the mapping uses at least one of:
a ratio of the energy of the direct sound to the energy of the total sound to weight total energy values, or
a ratio of the energy of the direct sound to the energy of a non-direct sound to weight non- direct energy values.

14. A method comprising:
receiving metadata, wherein the metadata comprises direct sound information that provides an indication of a balance between direct sound and other sound;
determining a plurality of metrics associated with respective ones of multiple directions, based on the received metadata, wherein the plurality of metrics are dependent on an amount of the direct sound; and accumulating, for the respective ones of the multiple directions, respective values dependent upon the plurality of metrics to enable determination of one or more sound source directions.

15. A method as claimed in claim 14, wherein the plurality of metrics are separately determined for multiple frequencies at a same time period, wherein accumulating, across multiple time periods and the multiple frequencies, the respective values dependent upon the plurality of metrics associated with the respective ones of the multiple directions to enable the determination of the one or more sound source directions.

16. A method as claimed in claim 15, wherein accumulating the respective values using a frequency-dependent weighting that weights values dependent upon the plurality of metrics for a first frequency more than values dependent upon the plurality of metrics for a second different frequency in the accumulation.

17. A method as claimed in claim 14, wherein the metadata comprises a value dependent upon a ratio of energy of the direct sound and energy of the other sound.

18. A method as claimed in claim 14, wherein the metadata comprises:
    first metadata, for the accumulating, defining the respective ones of the multiple directions; and
    second metadata, for the determining of the plurality of metrics, dependent on the amount of the direct sound relative to an amount of reverberation or ambient sound.

19. A method as claimed in claim 14, wherein the metadata comprises, at least, metadata for multiple time periods, wherein metadata for a respective time period of the multiple time periods comprises metadata for multiple frequencies during the respective time period.

20. A method as claimed in claim 14, wherein the plurality of metrics are direct energy metrics that indicate, for the respective ones of the multiple directions, an energy of the direct sound.

21. A non-transitory computer-readable medium comprising program instructions stored thereon which, when executed with at least one processor, cause the at least one processor to perform the method claimed in claim 14.

* * * * *